United States Patent Office 3,189,528
Patented June 15, 1965

3,189,528
RESOLUTION OF RACEMIC Δ⁴-3-KETO-13β-ALKYL STEROIDS BY USING *CORYNEBACTERIUM SIMPLEX*
Leland L. Smith, Malvern, George Greenspan, Narberth, and Theodore J. Foell, King of Prussia, Pa., assignors to American Home Products Corporation, New York, N.Y., a corporation of Delaware
No Drawing. Filed July 25, 1963, Ser. No. 297,656
12 Claims. (Cl. 195—51)

This invention relates to a method of producing steroids having natural configuration and more particularly relates to a method of resolving racemic steroids by microbiological means.

According to the method of the present invention, it has been found that selected racemic steroids of the Δ⁴-3-ketone type on treatment with a particular microbiological agent can be resolved in a manner that results in the production of specific steroids having $d$ (natural) and $l$ (unnatural) configurations. As used herein, natural configuration means that the steroid molecule will rotate a beam of polarized light to the right or left in a manner similar to the rotational characteristics of the analogous naturally occurring steroids as determined by conventional test procedures. The present invention therefore encompasses both a new method of preparing particular classes of steroids as well as a method of obtaining steroids of selected configuration from sources heretofore unavailable.

More particularly, according to the present invention, it has been found that microbiological dehydrogenation carried out on racemic 13β-alkyl-17-substituted-gon-4-ene-3-ones results in the simultaneous production of both 17β-hydroxy and 17 - keto-13β-alkyl-gona-1,3,5(10)-trienes having natural configuration. These products may then be separated by chromatography or other means for use as biologically active steroids in themselves or as intermediates in the production of other desired steroids as is described in detail below.

The microbiological dehydrogenation essential to the resolution and production of these natural configuration steroids is accomplished by the action of a microorganism of the family of Corynebacteriaceae. It has been found that the species *Corynebacterium simplex* of the foregoing family is unexpectedly effective in accomplishing the resolution according to the method of the present invention, which is illustratively shown by the following reaction sequence:

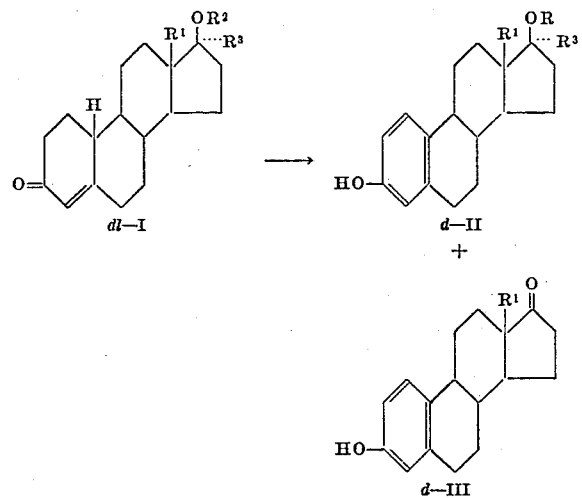

In the foregoing formula, $R^1$ represents lower alkyl; $R^2$ is selected from the group consisting of hydrogen and acyl; and $R^3$ is selected from the group consisting of hydrogen, lower alkyl, lower alkenyl and lower alkynyl.

The lower alkyl substituents referred to above include methyl, ethyl, propyl, isopropyl, butyl, isobutyl and the like. The acyl substituent identified by $R^2$, includes the acyl radicals derived from the lower molecular weight monocarboxylic acids having less than 10 carbon atoms and which may be in straight, branched or cyclic configuration. Typical esters include the acetate, propionate, butyrate, valerate, benzoate and the like. $R^2$, as is shown clearly hereafter in the examples, will in most instances be hydrogen, thus placing a hydroxyl group at the 17 position.

It will be noted according to the reaction shown that the structures encompassed with Formulae II and III both have $d$ or dextro configuration thus corresponding to natural steroids. In terms of quantity of product obtained, more of the steroid corresponding to Formula III is obtained as will be evident from the examples which follow. As has previously been suggested, there is also obtained and quite unexpectedly so, some unaltered $l$-substrate. Thus a complete resolution of the racemic starting material is obtained. With respect to the latter, i.e., the starting material, it will be noted that they (I) are identified as racemic mixtures. These starting racemic steroids are obtained according to the method described in detail in copending application Serial Number 228,384, filed October 4, 1962, and Belgian Patents 608,370 and 608,369 and patents cited therein.

In order to effect conversion of the selected racemic steroids of the type encompassed within those defined by Formula I above, it is necessary that the mixture be acted upon by a microorganism such as *Corynebacterium simplex* as has been described. The desired growth of *Corynebacterium simplex* (American Type Culture Collection 6946), utilized in the process of this invention, is accomplished in a suitable nutrient medium containing carbohydrate, organic nitrogen and inorganic salts in accordance with well known technique. The racemic steroid starting material is then dissolved or suspended in a solvent such as ethanol, acetone or any other water-miscible solvent which is non-toxic toward the organism, and added to the cultivated microorganism in a broth medium. This culture is then shaken, aerated or simultaneously aerated and agitated, in order to enhance the growth of *Corynebacterium simplex* and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid.

A useful method for carrying out the process of the present invention is the cultivation of *Corynebacterium simplex* on a suitable nutrient medium under aerobic conditions. A suitable volume of the cell suspension is then seeded into nutrient media of the same or altered composition for supporting growth of the microorganism. The nutrient medium employed may be a yeast extract-dextrose medium, casein hydrolysate, corn steep liquor, water extract of soybean oil meal or lactalbumin hydrolysate together with an appropriate carbon source.

The addition of inorganic salts may be desirable to maintain a pH level in the reaction medium of between 6.8 and 7.2. If the use of inorganic salts for buffering the reaction mixture is omitted, a pH rise from an initial value of 6.8 to about 7.7–8 may be noted. The optimum temperature for growth of the selected microorganism is 25° C., but the temperature may vary between 25° and 37° C., and even between 20° and 40° C. without adversely affecting the microorganism if the higher temperature is not maintained over long periods of time. The time of reaction may vary from as little as 3 hours to as much as 120 hours and will depend on the steroid being added. Any water miscible, nontoxic to the organism solvent may be employed to dissolve or suspend the steroid. Preferable solvents are ethanol and acetone either of which may be used in such amounts that the final concentration of these solvents in the reaction mixture is no higher than about 7% and may amount to only traces. Due to evaporation, the final concentration of the organic solvent may be substantially zero.

Recovery of the desired product is accomplished by extraction with a suitable water immiscible solvent followed by filtration, adsorption or other of the commonly used procedures practiced in the art of steroid recovery under similar conditions. The purified products may be separated from other steroids by chromatography, fractional crystallization, counter-current distribution, or other conventional separation techniques. If extraction is used to recover the steroid product, chlorinated lower hydrocarbons, ketones or alcohols may be used. Included within these solvents would be chloroform, methylene chloride, trichloroethane, ethylene dichloride, butanol, diethylketone, methyl isobutyl ketone and the like. For purposes of the present invention recovery of the desired steroid following conversion by the extraction method is preferred.

As has previously been suggested, the resolved products of the present invention more specifically the $d$-steroids encompassed within Formulae II and III above are valuable for their estrogenic activity. Equally important, however, is the fact that, as resolved, these steroids are useful as intermediates for the further synthesis of the 19-nor-$\Delta^4$-3-keto steroids (VII) which are useful as androgenic hormones.

The preparation of such steroids in a resolved form, such as for example the $d$- (natural) configuration, is of particular significance in that the method of the present invention provides a new source of steroids of this type. A specific example of a synthesis of this type and the product obtainable thereby is set forth in Example IV below. The reaction sequence shown below graphically illustrates such a synthesis in broad terms. The starting material utilized is encompassed within those defined by Formula III:

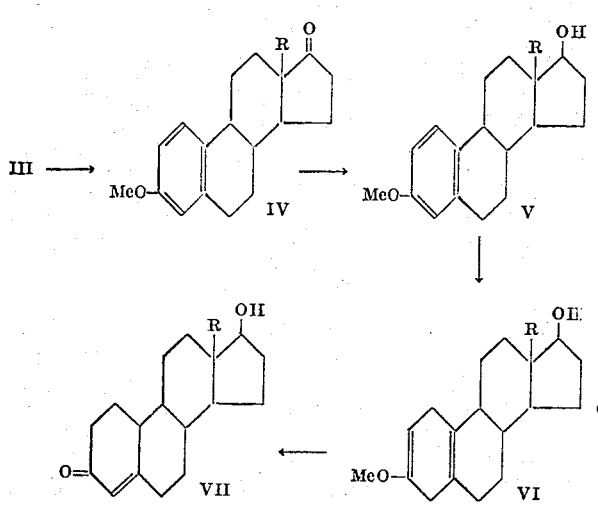

In the foregoing reaction, steroid III is treated with dimethyl sulfate in base to produce compound IV which is then treated with sodium borohydride to yield steroid V. The latter on treatment with lithium in the presence of liquid ammonia results in steroid VI which on hydrolysis affords the resolved product VII. This structure will have a positive rotation and is particularly useful for its androgenic activity. It is of course understood in the foregoing sequence that the substituent R at the 13β position has the values defined for $R^1$ in the Formulae I–III above. The foregoing reaction is in itself of considerable importance since the intermediates shown are in themselves useful for the further synthesis of resolved $\Delta^4$-3-keto-steroids of known structures having valuable biological activity. The reaction set forth below, in which steroid IV of the previous reaction sequence is used as a starting material is representative of the synthesis which may be carried out with the resolved intermediates described.

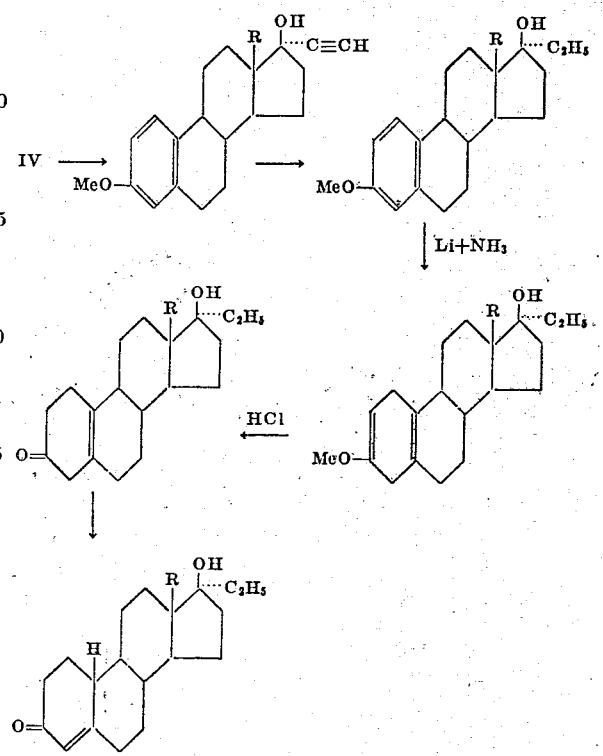

As will be obvious from the foregoing, other similar reaction sequences may be followed utilizing known technique to provide valuable steroidal end products not previously available from the heretofore unresolved racemic mixtures.

Reference now to the specific examples which follow will provide a better understanding of the present invention. In Example I, the manner in which fermentation by the selected *Corynebacterium simplex* organism is used is described in detail. Variations in the manner in which this microorganism can be prepared and used according to the method of the present invention and to the various products obtainable therefrom are shown in Example II through VII.

EXAMPLE I

One ml. of a cell suspension of *Corynebacterium simplex* (*Arthrobacter simplex*) ATCC 6946 prepared by washing the growth on the surface of an agar slant with 5 ml. of distilled water, is transferred to a 250 ml. flask with 50 ml. of the following sterilized medium: yeast extract 10.0 g./l., dextrose 10.0 g./l. and distilled water 1 l. The flask is incubated on a reciprocating shaker at 28° C. for 24 hours, after which 10% transfers are made to two 250 ml. flasks each with 50 ml. of the above medium. Following 17 hours of shaking as above, 15 mg.

of racemic 13β-ethyl-17β-hydroxygon-4-en-3-one in 0.375 ml. of ethanol is added to one flask and 20 mg. of the same steroid in 0.5 ml. of ethanol is added to the second.

The flasks are incubated on a rotary shaker, 250 r.p.m., at 28° C. Five ml. samples are taken at 1, 2, 3 and 5 days and each is equilibrated with 1 ml. of methyl isobutyl ketone. The extracts are spotted on No. 4 Whatman paper and the sheets chromatographed in the toluene/propylene glycol solvent system. After drying, the papers are sprayed with a mixture of equal arts of 1% $FeCl_3$ and 1% $K_3Fe(CN)_6$ solutions. Two products positive to Turnbull blue are noted, one with the $R_f$ of the steroid substrate and the other with a more polar $R_f$.

*Large flask fermentation*

The surface growth of *Corynebacterium simplex* ATCC 6946 on six agar slants is washed with 5 ml. of distilled water per slant. One half the volume of each suspension is used to inoculate 12 one liter flasks, each with 200 ml. of the medium described in Example I. The flasks are incubated for 25.5 hours on a reciprocating shaker, after which 9% transfers are made to 44 two liter flasks, each with 400 ml. of the same medium. The flasks are shaken as above for 23 hours, before the addition of dl-13β-ethyl-17β-hydroxygon-4-en-3-one, 30 mg./ml. in ethanol, to give a concentration of 0.4 g./l. in each flask.

The supplemented flasks are further incubated on rotary shakers at 26° C. and 28° C. and the course of the conversion followed by paper chromatography as described above. Samples taken at 22.5 hours show the same transformations noted in Example I with some substrate remaining. The flasks are harvested for extraction at 27 hours.

EXAMPLE II

Two hundred and fifty ml. flasks with 50 ml. of yeast extract-dextrose medium are inoculated with *Corynebacterium simplex* ATCC 6946 as in Example I. The flasks are incubated and transfers made in triplicate according to Example I. After 24 hours incubation on the reciprocating shaker, 28° C., dl-17β-hydroxy-13β-n-propylgon-4-en-3-one, dissolved in ethanol, is added to each flask to give steroid concentrations of 0.25, 0.35 and 0.5 g./l. The flasks are incubated on a rotary shaker, 250 r.p.m., at 28° C. Five ml. samples are taken at 22, 56 and 67 hours. The procedure for extraction, running of paper chromatograms and testing for phenolic steroids is similar to that in Example I. Two products positive to Turnbull blue are noted at each sampling time; one with the $R_f$ of the steroid substrate, the other with a more polar $R_f$. Some substrate remains in each flask at 67 hours.

EXAMPLE III

A large flask fermentation, in one and two liter flasks, is prepared similar to the one described in Example I using *Corynebacterium simplex*. The flasks are incubated on a reciprocating shaker for 24 hours, after which 9% transfers are made to 54 2-l. flasks and 15 1-l. flasks of yeast extract-dextrose medium. The flasks are shaken as above for 19 hours before the addition of dl-17β-hydroxy-13β-n-propylgon-4-en-3-one, 50 mg./ml. in ethanol, to give a concentration of 0.3 g./l. in each flask.

The flasks are incubated on rotary and reciprocating shakers at 26 and 28° C. for 26.5 hours before harvesting for extraction. A total of 7.353 g. of steroid fermented.

A fermentation broth obtained in which *Corynebacterium simplex* on 7.353 g. of racemic 17β-hydroxy-13β-propylgon-4-ene-3-one is extracted three times with 10 l. of ethyl acetate, and the combined ethyl acetate extracts are evaporated under diminished pressure to ca. 40 ml. The solids which precipitate are filtered, washed, dried and weighed (1.134 g.). Thin-layer chromatographic analysis of this product indicates that there are two components, 13β-propylgona-1,3,5(10)-triene-3,17β - diol and 3 - hydroxy - 13β-propylgona-1,3,5(10)-trien-17-one. Column chromatography on 200 g. of silica gel gives 1.036 g. of d-3-hydroxy-13β-propylgona-1,3,5(10) - trien - 17 - one (eluted with 1% ethyl acetate in benzene), which affords the analytically pure product on recrystallization from methanol-chloroform and sublimation. The pure product is characterized as follows: M.P. 87–99° C., resolidifying by 165° C., remelting 187–188° C.; $[\alpha]_D$ +116.5° (1% in chloroform).

Further elution of the column with 1% ethyl acetate in benzene gives a mixture of the two aromatic products d-3-hydroxy-3β-propylgona-1,3,5(10)-trien-17 - one and d-13β-propylgona-1,3,5(10)-triene-3,17β-diol.

Still further elution of the column with 2.5–5% ethyl acetate in benzene gives 1.760 g. of l-17β-hydroxy-13β-propylgon-4-ene-3-one, which is recrystallized from benzene/petroleum ether and from acetone several times, yielding 1.49 g. of pure product, M.P. 139–142° C.; $[\alpha]_D$ —46.6° (1% in chloroform).

Utilizing fermentation broths obtained in the manner suggested in the previous examples, a series of separations is carried out on the resolved steroids according to the method of the present invention. The technique employed to separate the resolved components was a chromatographic technique based on the use of silica gel and elution with a selective solvent such as ethyl acetate/benzene. The separations effect by this technique will be more clearly understood by reference to the example which follows.

EXAMPLE IV

The harvested fermentation broth (obtained from 7.00 g. of the racemate of Example I) is extracted three times with 9 l. of ethyl acetate, and the combined extracts evaporated under vacuum, yielding 2.08 g. of crude solids which contain both the 3-hydroxy-17-ketone (III in which $R^1$ is $C_2H_5$) and the 3,17β-diol (II in which $R^1$ is $C_2H_5$, $R^2$ is H, $R^3$ is H) by thin-layer chromatographic analysis. Chromatography of the mixture on 150 g. of silica gel (prepared in benzene) gives 1.1926 g. of the crude 17-ketone (above) (eluted with 4% ethyl acetate in benzene), $[\alpha]_D$ +93.3° (0.5% in ethyl acetate). Recrystallization of the crude product from chloroform gives the analytical sample 886 mg., M.P. 252–253.5°, with phase transition at ca., 210° (Kofler block); $[\alpha]_D$ +108.5° (0.5% in ethyl acetate); $\lambda_{max}$ 282 m$\mu$ ($\epsilon$ 2,170), 287 m$\mu$ ($\epsilon$ 2,060);

$$\lambda_{max}^{KBr}\ 3.08\mu,\ 5.85\mu,\ 6.20\mu,\ 6.33\mu,\ 6.67\mu,\ etc.$$

$R_f$ on thin-layer chromatograms, 0.63 and 0.13 in hexane-ethyl acetate (1:1) and (4:1) respectively, positive to Zimmerman reagent.

An additional 117 mg. of pure product is recovered from the chloroform mother liquor.

In another fermentation of 6.72 g. of racemic substrate, 2.7 g. of crude solids is isolated from which 1.9 g. of d-17-ketone (above), M.P. 249–250° C. (containing only a trace of the 3,17β-diol (above) thin-layer chromatography) is obtained by recrystallization from methanol-chloroform. The mother liquors from the two fermentations are combined, partitioned between water and hexane, and the solids (5.4 g.) obtained by extraction of the water layer with chloroform are chromatographed on silica gel. Elution of the column with benzene and with 5% ethyl acetate in benzene gives 450 mg. of d-17-ketone, M.P. 252–253° C. from methanol; $[\alpha]_D$ + 117.5° (0.5% in ethyl acetate); $\lambda_{max}$ 280 m$\mu$ ($\epsilon$ 2,170), 287 m$\mu$ ($\epsilon$ 2,000); identical with previously isolated d-17-ketone (above) by infrared spectra and by thin-layer chromatographic behavior.

Further elution of the above column with 5% ethyl acetate in benzene gives d-13β-ethylgona-1,3,5(10)-triene-3,17β-diol, 190 mg., homogeneous by thin-layer chromatography. Recrystallization from chloroform-ethyl acetate gives the pure product, M.P. 183–185° C., solvated with ethyl acetate.

($\lambda_{max}^{KBr}$ 5.78μ)

Sublimation of the crystalline material at 210° C. gives the unsolvated analytical sample, M.P. 106° C. and 187–189° C.; [α]$_D$ +58.5°; λ$_{max}$ 281 mμ (ε 2,050), 288 mμ (ε 1,885).

Still further elution of the column with 5% ethyl acetate in benzene affords 1.6 g. of unaltered substrate, which is recrystallized from chloroform-ethyl acetate, yielding 1.0 g. of pure l-13β-ethyl-17β-hydroxygon-4-en-3-one, M.P. 154–156° C., [α]$_D$ −55.2° (1% chl.); λ$_{max}$ 240 mμ (ε 17,446).

EXAMPLE V

Fermentation broth obtained from 5.23 g. of racemic 13β-ethyl-17β-hydroxygon-4-en-3-one is extracted three times with 9 l. of ethyl acetate. The solvent layer is evaporated under vacuum, and 5 ml. of water added to the concentrated liquid. The precipitated solids are filtered, washed with hexane, and dried, thus yielding 2.08 g. of material shown to be a mixture of 13β-ethyl-3-hydroxy-gona-1,3,5(10)-trien-17-one and 13β-ethyl-gona-1,3,5(10)-triene-3,17β-diol. The mixture is chromatographed on 150 g. of silica gel, and the product, phenolic 17-ketone eluted with 4% ethyl acetate in benzene, yielding 1.1926 g. of material with [α]$_D$ +93.3° C. Recrystallization of the material from chloroform gives the pure product, d-13β-ethyl - 3 - hydroxygona-1,3,5(10)-trien-17-one, M.P. 252–253.5° C. (with phase transition at ca. 210° C.); [α]$_D$ +108.5° (0.5% in ethyl acetate); λ$_{max}$ 282 mμ (ε 2,170), 287 mμ (ε 2,060).

EXAMPLE VI

A solution of 856 mg. of the product of Example V in 40 ml. of boiling ethanol is treated with 7.2 ml. of 60% sodium hydroxide solution and then with 10 ml. of dimethyl sulfate. The addition sequence of alkali and dimethyl sulfate is repeated three more times, after which time the mixture is cooled and 100 ml. of water added. The mixture is then chilled in an ice bath and the product filtered, washed with water and dried, yielding 881 mg. of product, 13β-ethyl-3-methoxygona-1,3,5(10)-trien-17-one.

The entire product is dissolved in 10 ml. of boiling ethanol and 100 mg. of sodium borohydride added. The mixture is then refluxed for two hours, after which time an additional 20 mg. of sodium borohydride is added and the reflux continued for one hour. After cooling to room temperature, 1.0 ml. of 50% aqueous acetic acid is added, followed by 8 ml. of water. The mixture is concentrated in vacuum to remove the ethanol. The crystals are filtered, washed with methanol, and dried. The product, 13β-ethyl-3-methoxygona - 1,3,5(10)-trien-17β-ol weighs 852 mg.

A solution containing 850 mg. of 13β-ethyl-3-methoxygona-1,3,5(10)-trien-17β-ol in 21.5 ml. of 1-methoxy-2-propanol is added to 135 ml. of liquid ammonia (distilled over metallic lithium) and 34 ml. of 1-methoxy-2-propanol. Lithium metal (0.87 g.) is added in small pieces with vigorous stirring. After 30 minutes of stirring, the ammonia is allowed to evaporate and 108 ml. of water is added. The mixture is cooled in ice and filtered. The solids are washed twice with 30 ml. of water and dried, yielding 900 mg. of product. Chromatography of the crude product on silica gel affords the sought 13β-ethyl-3-methoxygona-2,5(10)-dien-17β-ol, which is then hydrolyzed by dissolving in alcohol and treating with hydrochloric acid to afford the final product, 13β-ethyl-17β-hydroxygon-4-en-3-one, resolved, and having a positive rotation.

EXAMPLE VII

A fermentation broth in which Corynebacterium simplex has acted upon 5.0 g. of racemic 13β,17α-diethyl-17β-hydroxygon-4-ene-3-one is extracted several times with ethyl acetate, and the combined ethyl acetate extracts evaporated under reduced pressure. The crystalline product weighs 1.1 g. and is shown to be a mixture of unaltered substrate and 13β,17α-diethylgona - 1,3,5(10)-triene-3,17β-diol by thin-layer chromatography. The mother liquor is similarly analyzed and shown to contain the same proportions of product and substrate. The two samples are recombined and chromatographed on 400 g. of silica gel. Elution with benzene-ethyl acetate (9:1) gives the product d-13β,17α-diethylgona-1,3,5(10)-triene-3,17β-diol, and combination of these fractions gives 650 mg. of this sought product of the transformation. Recrystallization of the product from ether gives the analytically pure sample, M.P. 170–181° C.; [α]$_D$ +27.4° (1% in chloroform); λ$_{max}$ 281.5 mμ (ε 2,021), 288.5 mμ (ε 1,826).

Further elution of the column with the same solvent gives 1.0 g. of mixed fractions, and finally 990 mg. of partially resolved 13β,17α-diethyl-17β-hydroxygon-4-ene-3-one, which is recrystallized from ethyl acetate-hexane, M.P. 140–162° C., [α]$_D$ −6.5° [2% in chloroform methanol (1:1)].

While the compounds and method of the present invention have been described with some degree of particularity in the foregoing discussion and in the examples, it is to be understood that nothing contained therein is in anyway to be construed as a limitation on the scope of this invention. The latter is to be limited only by the claims appended hereto.

The invention claimed is:

1. The method of preparing compounds of the structure:

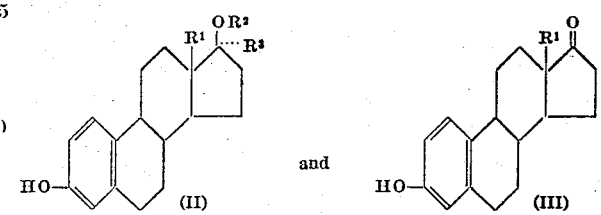

which comprises subjecting a racemic compound of the structure:

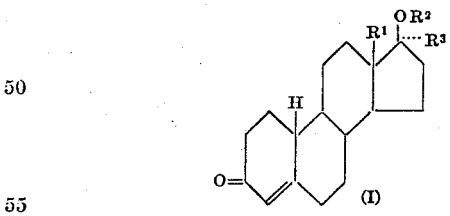

wherein R$^1$ is lower alkyl having more than one carbon atom; R$^2$ is selected from the group consisting of hydrogen and acyl; R$^3$ is selected from the group consisting of hydrogen, lower alkyl, lower alkenyl and lower alkynyl to the microbiological action of Corynebacterium simplex to effect A ring aromatization.

2. The method of claim 1 in which the compounds (II) and (III) are separated by chromatography.

3. The method of claim 1 wherein compound (I) is dl-13β-alkyl-17β-hydroxygon-4-en-3-one.

4. The method of claim 3 wherein compound (I) is dl-13β-ethyl-17β-hydroxygon-4-en-3-one.

5. The method of claim 3 wherein compound (I) is dl-13β-propyl-17β-hydroxygon-4-en-3-one.

6. The method of claim 1 wherein the compound subjected to microbiological action is dl-13β-ethyl-17β-hydroxygon-4-en-3-one and the products obtained are d-13β-ethyl-3,17β-dihydroxygona-1,3,5(10)-triene and d - 13β-ethyl-3-hydroxygona-1,3,5(10)-trien-17-one.

7. The method of a ring aromatization of racemic steroids having the structure:

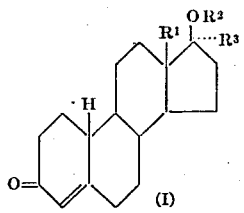

wherein R¹ is lower alkyl; R² is selected from the group consisting of hydrogen and acyl; R³ is selected from the group consisting of hydrogen, lower alkyl, lower alkenyl and lower alkynyl with *Corynebacterium simplex,* which comprises subjecting a racemic mixture of a steroid of structure (I) to microbiological A ring aromatization by means of the microorganism *Corynebacterium simplex* and separating the resulting products which have the Formulae II and III of claim 1, having *d* configuration.

8. The method of claim 7 wherein separation of the products is accomplished by chromatography.

9. The method of claim 7 in which the racemic steroid treated is *dl*-13β-alkyl-17β-hydroxygon-4-en-3-one.

10. The method of claim 7 in which *Corynebacterium simplex* ATCC 6946 is used.

11. The method of claim 9 in which the racemic steroid dehydrogenated is *dl*-13β-ethyl-17β-hydroxygon-4-en-3-one.

12. The method of claim 9 in which the racemic steroid dehydrogenated is *dl*-13β-propyl-17β-hydroxygon-4-en-3-one.

References Cited by the Examiner
UNITED STATES PATENTS

| 2,844,513 | 7/58 | Wettstein et al. | 195—51 |
| 2,874,172 | 2/59 | Herzog et al. | 195—51 |

A. LOUIS MONACELL, *Primary Examiner.*

UNITED STATES PATENT OFFICE
CERTIFICATE OF CORRECTION

Patent No. 3,189,528                          June 15, 1965

Leland L. Smith et al.

It is hereby certified that error appears in the above numbered patent requiring correction and that the said Letters Patent should read as corrected below.

Column 1, formula "d-II" should appear as shown below instead of as in the patent:

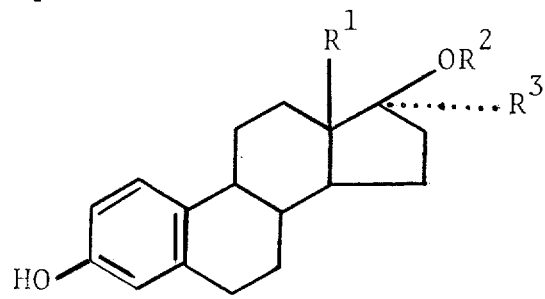

column 5, line 10, for "equal arts" read -- equal parts --; column 6, line 12, for "d-3-hydroxy-3β-" read -- d-3-hydroxy-13β- --; line 59, after "(above)" insert -- by --; column 9, line 1, for "a" read -- A --.

Signed and sealed this 3rd day of May 1966.

(SEAL)
Attest:

ERNEST W. SWIDER                      EDWARD J. BRENNER
Attesting Officer                    Commissioner of Patents